US 12,143,272 B2

(12) United States Patent
Gagula

(10) Patent No.: US 12,143,272 B2
(45) Date of Patent: *Nov. 12, 2024

(54) NETWORK CAPACITY PLANNING SYSTEMS AND METHODS

(71) Applicant: Bank of Montreal, Toronto (CA)

(72) Inventor: Feliks Gagula, Toronto (CA)

(73) Assignee: Bank of Montreal, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,648

(22) Filed: Jun. 30, 2023

(65) Prior Publication Data

US 2023/0344718 A1 Oct. 26, 2023

Related U.S. Application Data

(63) Continuation of application No. 17/740,233, filed on May 9, 2022, now Pat. No. 11,695,638, which is a (Continued)

(51) Int. Cl.
*G06F 15/173* (2006.01)
*H04L 41/0896* (2022.01)
(Continued)

(52) U.S. Cl.
CPC .......... *H04L 41/0896* (2013.01); *H04L 41/22* (2013.01); *H04L 43/0876* (2013.01); *H04L 43/106* (2013.01); *H04L 43/16* (2013.01)

(58) Field of Classification Search
CPC . H04L 41/0896; H04L 41/22; H04L 43/0876; H04L 43/106; H04L 43/16;
(Continued)

(56) References Cited

U.S. PATENT DOCUMENTS 7,460,874 B1 12/2008 Hou et al.
9,838,440 B2 12/2017 Wiley et al.
(Continued)

OTHER PUBLICATIONS

"Virtual Instruments Brings an End to Costly IT War Rooms with Next Generation of VirtualWisdom Hybrid Infrastructure Management Platform," Globe Newswire, Oct. 23, 2018 (4 pages).
(Continued)

*Primary Examiner* — Dustin Nguyen
*Assistant Examiner* — Hao H Nguyen
(74) *Attorney, Agent, or Firm* — FOLEY & LARDNER LLP

(57) ABSTRACT

A network capacity planning system for forecasting and scheduling of network capacity for electronic devices is provided. A server monitors usage of a network associated with the electronic devices. The server analyzes a frequency of a transmission of data packets between the electronic devices and the network, and a time duration of a network busy time based on predetermined thresholds. The server uses results of the analysis to drive a dynamic mechanism, which identifies when a bandwidth associated with the network needs to be upgraded to support the growing network bandwidth requirements. The server adjusts a network capacity value of a network routing device associated with the network to support the required bandwidth for an operation of the electronic devices.

20 Claims, 3 Drawing Sheets

Related U.S. Application Data continuation of application No. 16/901,365, filed on Jun. 15, 2020, now Pat. No. 11,329,884.

(60) Provisional application No. 62/862,488, filed on Jun. 17, 2019.

(51) Int. Cl.
*H04L 41/22* (2022.01)
*H04L 43/0876* (2022.01)
*H04L 43/106* (2022.01)
*H04L 43/16* (2022.01)

(58) Field of Classification Search
CPC ..... H04L 41/145; H04L 41/06; H04L 43/062; H04L 43/067
See application file for complete search history.

(56) References Cited

U.S. PATENT DOCUMENTS

| | | | |
|---|---|---|---|
| 9,929,926 | B1 | 3/2018 | Streete et al. |
| 11,329,884 | B2 | 5/2022 | Gagula |
| 2009/0006626 | A1 | 1/2009 | Yamagishi |
| 2010/0296402 | A1 | 11/2010 | Fraccalvieri et al. |
| 2011/0229126 | A1 | 9/2011 | Gerstel |
| 2012/0230214 | A1 | 9/2012 | Kozisek et al. |
| 2013/0188483 | A1 | 7/2013 | Teepell et al. |
| 2013/0268984 | A1 | 10/2013 | Salinger et al. |
| 2015/0052250 | A1* | 2/2015 | Doganata ............ H04L 47/78 709/226 |
| 2015/0120856 | A1 | 4/2015 | Bennett et al. |
| 2015/0142947 | A1 | 5/2015 | Dyba et al. |
| 2015/0281028 | A1 | 10/2015 | Akhter et al. |
| 2015/0304187 | A1 | 10/2015 | Brown |
| 2016/0105237 | A1 | 4/2016 | Wang et al. |
| 2016/0294870 | A1 | 10/2016 | Banerjee et al. |
| 2017/0171053 | A1 | 6/2017 | Giroux et al. |
| 2017/0187602 | A1 | 6/2017 | Pathela |
| 2017/0302580 | A1 | 10/2017 | Luo et al. |
| 2017/0316437 | A1* | 11/2017 | Huntwork ........... H04L 43/0876 |
| 2018/0109415 | A1 | 4/2018 | Han et al. |
| 2018/0203963 | A1 | 7/2018 | Eghbal et al. |
| 2018/0278543 | A1* | 9/2018 | Gopalan ............... H04L 47/823 |
| 2019/0207860 | A1* | 7/2019 | York ................... G06F 9/45558 |
| 2019/0306078 | A1 | 10/2019 | Crosby et al. |
| 2019/0327185 | A1 | 10/2019 | Hassan et al. |
| 2019/0342325 | A1 | 11/2019 | Blass et al. |
| 2020/0106746 | A1 | 4/2020 | Park et al. |
| 2020/0120131 | A1* | 4/2020 | Soni ........................ H04L 41/14 |
| 2020/0177485 | A1* | 6/2020 | Shurtleff ............... H04L 41/142 |
| 2020/0404047 | A1 | 12/2020 | Kurhe et al. |
| 2022/0150760 | A1* | 5/2022 | Balasubramanian ........................ H04L 43/0876 |
| 2022/0385581 | A1* | 12/2022 | Delos Reyes ......... H04L 43/062 |
| 2023/0344718 | A1* | 10/2023 | Gagula ................ H04L 41/145 |

OTHER PUBLICATIONS

Canadian Office Action on CA Appl. Ser. No. 3083652 dated May 12, 2022 (6 pages).

Examination Report for CA Appl. Ser. No. 3083652 dated Aug. 13, 2021 (6 pages).

* cited by examiner

NETWORK CAPACITY PLANNING SYSTEMS AND METHODS

CROSS-REFERENCE TO RELATED APPLICATIONS

This application is a continuation of U.S. patent application Ser. No. 17/740,233, filed May 9, 2022, which is a continuation of U.S. patent application Ser. No. 16/901,365, filed Jun. 15, 2020, which claims priority to U.S. Provisional Patent Application No. 62/862,488, filed Jun. 17, 2019, each of which is incorporated by reference herein in its entirety.

TECHNICAL FIELD

The subject matter described herein relates generally to data network systems, and more specifically directed towards network capacity planning mechanisms for monitoring and adjusting network capacity values associated with network routing devices of the data network systems.

BACKGROUND

A company may have several branch offices in different locations connected via one or more networks within a distributed network enterprise environment. Each branch office may include multiple nodes, such as computers, servers, communication devices, and databases connected via the one or more networks. Multiprotocol label switching circuits may couple the multiple nodes to each other. The multiprotocol label switching circuits may use a routing technique that directs data from one node to a next node based on short path labels rather than long network addresses. The multiprotocol label switching circuits may employ a packet-forwarding technology that uses the path labels in order to make data forwarding decisions from one node to the next node. The path labels may identify virtual links or paths between the distant nodes.

As the use of the networks have expanded within the distributed network enterprise environment, the networks have become an important conduit for transmission and distribution of the data between the nodes of the different branches. Typically, each branch and its associated multiprotocol label switching circuit may have some amount of bandwidth resources for the transmission and the distribution of the data between the various nodes. However, because each branch may have a different amount of a workload at different times, some branches may have an excess amount of the bandwidth resources, and some branches may have a very low amount of the bandwidth resources with respect to their workload. When any one branch may have less bandwidth resources to manage their workload, there may be a disruption in an overall network operation of the company. Consequently, there is a delay in the transmission and the distribution of the data between the various nodes of different branches. The delay may lead to an unexpected unavailability and performance problems associated with the various nodes. The downtime of the nodes may be financially devastating to the company, which may depend heavily on the performance of each node for smooth running its overall operations. Accordingly, there has been an increased need for more reliability and trustworthiness in the network operation of the company.

SUMMARY

For the aforementioned reasons, what is therefore desired is a network capacity planning system for forecasting and revising network capacity for electronic devices and routers. The network capacity planning system may be a forward-looking resource management system, which may manage an accurate preparation of the network capacity for expected changes of resource utilization associated with the nodes and the electronic devices operating within a network. The network capacity planning system may proactively adjust the network to manage any expected changes of the resource utilization associated with the nodes and the electronic devices within the network.

The network capacity planning system may include a server that monitors usage of the network by the nodes and the electronic devices present at each branch of the company. The server may analyze a frequency and a time duration of a network busy time at each branch based on predetermined thresholds. The server may process results of the analysis to drive a dynamic apparatus. The execution of the dynamic apparatus may identify when a bandwidth associated with the network in one or more branches of the company needs to be upgraded to support growing or declining network bandwidth needs. As a result, the server may adjust a network capacity value of each network routing device associated with the network to support required bandwidth by the nodes and the electronic devices in each branch of the company. Accordingly, each branch may receive a precise amount of bandwidth in accordance with their particular usage. The accurate bandwidth resource allocation may be achieved by taking away extra bandwidth resources from the branches that do not need it and providing required bandwidth resources to the branches that do.

In an embodiment, a method comprises periodically monitoring, by a server, a network traffic value of a network routing device, the network traffic value corresponding to a volume of data packets communicated between a network and a set of electronic devices through the network routing device and a timestamp of communicated data packets, the network routing device having a network capacity value corresponding to a maximum volume of data packets communicated, wherein the network traffic value indicates a frequency of data packets being communicated that satisfy a network capacity threshold; and dynamically adjusting, by the server, the network capacity value of the network routing device when the network traffic value satisfies a network usage threshold.

In another embodiment, a system comprises a server in communication with network routing device, the server comprising a processor and a non-transitory computer-readable medium containing instructions that when executed by the processor causes the processor to perform operations comprises periodically monitor a network traffic value of the network routing device, the network traffic value corresponding to a volume of data packets communicated between a network and a set of electronic devices through the network routing device and a timestamp of the communicated data packets, the network routing device having a network capacity value corresponding to a maximum volume of data packets communicated, wherein the network traffic value indicates a frequency of data packets being communicated that satisfy a network capacity threshold; and dynamically adjust the network capacity value of the network routing device when the network traffic value satisfies a network usage threshold.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

DETAILED DESCRIPTION

Figure 1:
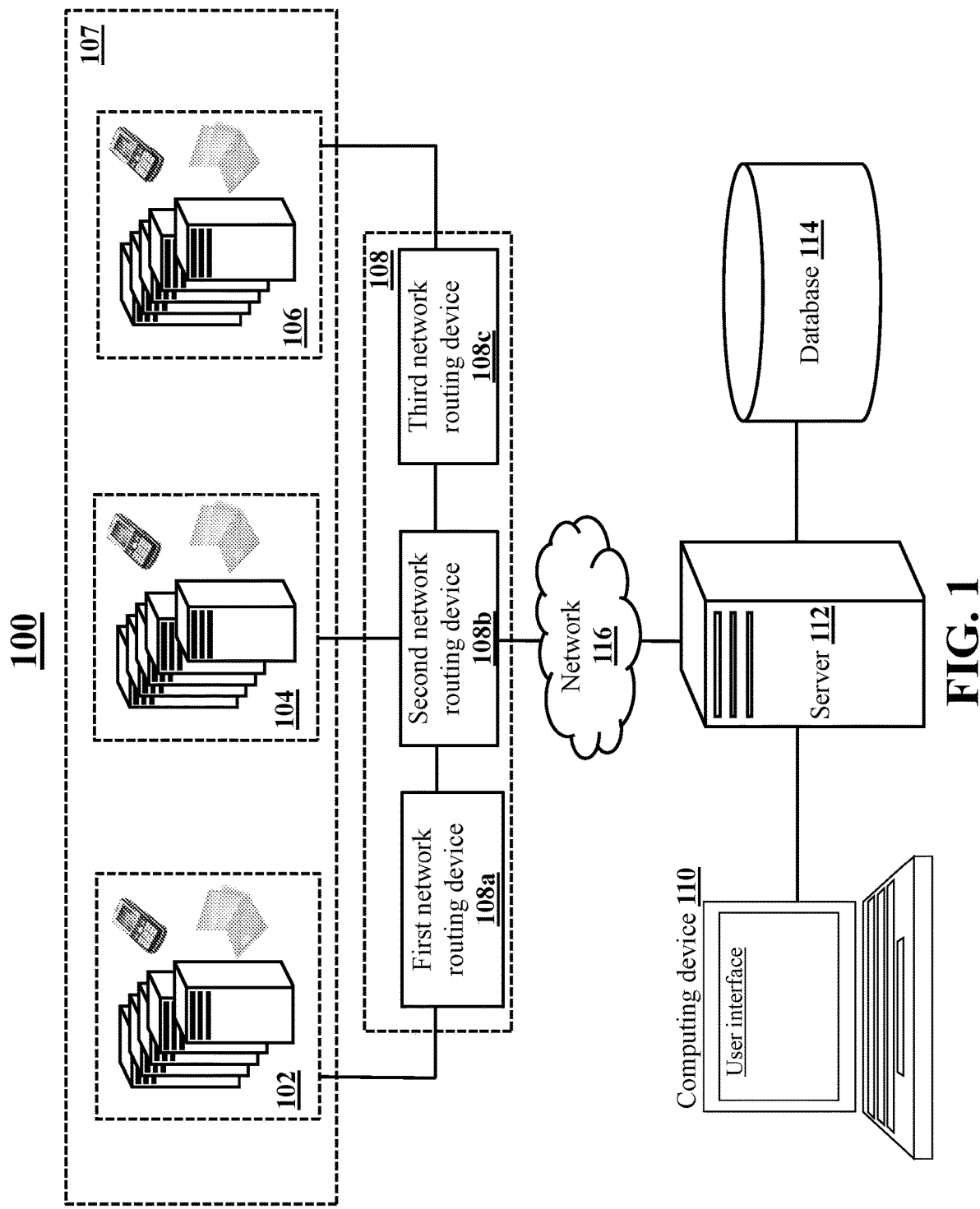
FIG. 1 shows various components of a network capacity planning system, according to an embodiment.

A network capacity planning system for a company having multiple branches is disclosed. The network capacity planning system measures network bandwidth utilization for an entire network and associated network circuits. The network capacity planning system may evaluate information associated with the network bandwidth utilization with respect to predetermined thresholds. The network capacity planning system may dynamically adjust network bandwidth for each branch of the company based on results of evaluation.

The network capacity planning system may include electronic devices, network routing devices, networks, network circuits, and servers. The network routing devices may be in control for directing various data packets. The networks may transmit the data packets to addresses of the electronic devices via the network routing devices. A server may capture a volume of the data packets received at the addresses of the electronic devices over a fixed period (for example, one day). The server may capture a frequency of a receipt of the data packets at the addresses of the electronic devices over the fixed period (for example, one day). The server may capture timestamps of the receipt of the data packets at the addresses of the electronic devices over the fixed period (for example, one day).

The server may determine a network busy time at each network routing device for each day using information associated with the volume, the frequency, and the timestamps of the data packets. The server may analyze the volume, the frequency, and the timestamps of the data packets based on predetermined thresholds to determine the network busy time. When the server determines that the network busy time for each day is consistently present over a predetermined period (for example, seven consecutive days), the server may upgrade bandwidth associated with the network to support growing network bandwidth needs. The server may store a value of the upgraded bandwidth in a database.

Reference will now be made to the embodiments in the drawings, and specific language will be used here to describe the same. It will nevertheless be understood that no limitation of the scope of the claims or this disclosure is thereby intended. Alterations and further modifications of the features explained herein, and additional applications of the principles of the subject matter explained herein, which would occur to one skilled in the relevant art and having possession of this disclosure, are to be considered within the scope of the subject matter disclosed herein. The present disclosure is here described in detail with reference to embodiments explained in the drawings, which form a part here. Other embodiments may be used and/or other changes may be made without departing from the spirit or scope of the present disclosure. The embodiments described in the detailed description are not meant to be limiting of the subject matter presented here.

FIG. 1 shows various components of a network capacity planning system 100. A financial company may employ the network capacity planning system 100 to optimize network capacity of its different branches by providing a dynamic bandwidth to each branch. The network capacity planning system 100 may include first electronic devices 102 located at a first branch of the financial company, second electronic devices 104 located at a second branch of the financial company, third electronic devices 106 located at a third branch of the financial company, a first network routing device 108a, a second network routing device 108b, a third network routing device 108c, computing devices 110, servers 112, and databases 114. The first electronic devices 102, the second electronic devices 104, and the third electronic devices 106 may be collectively referred to as electronic devices 107. The first network routing device 108a, the second network routing device 108b, and the third network routing device 108c may be collectively referred to as network routing devices 108.

The network capacity planning system 100 may operate in a context of computer-executable instructions, such as program modules. A server computer, such as the server 112 may execute the program modules. The program modules may include programs, objects, components, data structures, etc. that perform particular network bandwidth management tasks or implement particular abstract data types. The features of the network capacity planning system 100 may function either in a computing device or in a distributed computing environment, where the processing devices may perform the network management tasks. In a distributed computing environment, program modules may be located in both local and remote computer storage media including memory storage devices.

The electronic devices 107, the network routing devices 108, the computing devices 110, the servers 112, and the databases 114 may communicate with each other over the network 116. The network 116 may include, but is not limited to, a private local area network or a public local area network, a wireless local area network, a metropolitan area network, a wide-area network, and Internet. The network 116 may further include both wired and wireless communications, according to one or more standards, via one or more transport mediums. The communication over the network 116 may occur in accordance with various communication protocols, such as, a transmission control protocol and an internet protocol, a user datagram protocol, and an institute of electrical and electronics engineers communication protocols. The network 116 may further include wireless communications, according to Bluetooth specification sets, or another standard or proprietary wireless communication protocol. The network 116 may further include communications over a cellular network, including, for example, a global system for mobile communications, code division multiple access, and enhanced data for global evolution network.

The network capacity planning system 100 may operate in a local computing environment where the computing device 110 may execute various network data monitoring and management tasks. The database 114 and application programs associated with the server 112 may be stored and executed on local computing resources. The server 112 may locally query the database 114 to retrieve the network data records associated with the electronic devices 107 and/or the network routing devices 108 over a predefined period. The database 114 may store a summary of the network data records. The summary of the network data records may be according to an identifier associated with the electronic devices 107 and/or the network routing devices 108. The server 112 may analyze and evaluate the network data records to adjust the network capacity values associated with the network routing devices 108 in order to support growing network bandwidth needs within the network capacity planning system 100. The server 112 may present the network data records and the network capacity values on an interactive graphical user interface of the computing device 110.

The network capacity planning system 100 may operate in a cloud-computing environment where the computing device 110 may be cloud-optimized. The computing device 110 may execute a network data management software application to generate and transmit a request. The request may be associated with monitoring network data records associated with the electronic devices 107 and/or the network routing devices 108 over a predefined period. The network data management software application and the computing device 110 data and application programs may be stored and executed on a remote cloud-based server 112 accessed over a network cloud. In the cloud-computing environment, a web browser on the computing device 110 may interface with an application program corresponding to the network data management software application. The remote cloud-based server 112 may execute the network data management software application. Utilizing a browser executing on the computing device 110, a user may generate the request. The computing device 110 may transmit the request to the remote cloud-based server 112 via the application program. The remote cloud-based server 112 may monitor the network data records associated with the request and/or query the database 114 to retrieve the network data records associated with the request. The remote cloud-based server 112 may analyze and evaluate the network data records to adjust the network capacity values associated with the network routing devices 108 in order to support growing network bandwidth needs within the network capacity planning system 100. The remote cloud-based server 112 may present the network data records and the network capacity values on the interactive graphical user interface of the computing device 110.

In operation, multiple electronic devices 107 may communicate with each other. During the communication, the electronic devices 107 may transmit and receive data packets from the network 116 through the network routing devices 108. When the data packets are being transmitted between the electronic devices 107 and the network 116 through the network routing devices 108, the server 112 may periodically monitor network traffic values associated with the network routing devices 108 and/or the electronic devices 107. The server 112 may periodically monitor the network traffic values after every predetermined interval of time. The network traffic values may correspond to at least a volume of data packets transmitted from the network 116 to the electronic devices 107 through the network routing devices 108. The network traffic values may correspond to at least a frequency of data packets transmitted from the network 116 to the electronic devices 107 through the network routing devices 108. The network traffic values may correspond to at least a time duration of data packets transmitted from the network 116 to the electronic devices 107 through the network routing devices 108. The server 112 may store the network traffic values and time stamps associated with receipt and transmission of the data packets at addresses of the electronic devices 107 in the database 114.

The server 112 may calculate a network usage score using the network traffic values and/or the timestamps. The network usage score may correspond to the frequency of the volume of the data packets transmitted from the network 116 to the electronic devices 107 through the network routing devices 108 during a specific period.

The server 112 may compare the network usage score with a predetermined threshold value. When the network usage score satisfies the predetermined threshold value, the server 112 may dynamically adjust a network capacity value of one or more network routing devices 108 in order to support growing network bandwidth needs within the network capacity planning system 100. The network capacity value may be a maximum data carrying capacity or bandwidth expressed in units of bytes per second of the entire network 116 and each individual network circuit. The server 112 may store adjusted network capacity value of the one or more network routing devices 108 in the database 114.

Electronic devices 107 may be computing devices having a processor. The electronic devices 107 may further include a processing unit and a non-transitory machine-readable storage medium. The processing unit may include a processor with a computer-readable medium, such as a random access memory coupled to the processor. The electronic devices 107 may execute algorithms or computer executable program instructions, which may be executed by a single processor or multiple processors in a distributed configuration. The electronic devices 107 may interact with one or more software modules of a same or a different type operating within the network capacity planning system 100.

Non-limiting examples of the processor may include, but not limited to, a microprocessor, an application specific integrated circuit, and a field programmable object array, among others. The electronic devices 107 may be capable of executing various tasks, such as data processing tasks and data analysis tasks. Non-limiting examples of the electronic devices 107 may include a desktop computer, a server computer, a laptop computer, a tablet computer, a mobile phone, a watch, and the like.

The electronic devices 107 may be associated with the network routing devices 108, the computing device 110, the server 112, and the database 114 via the network 116. When a web connection is present between the electronic devices 107 via the network 116, the electronic devices 107 may execute multiple tasks and communicate with each other. During the execution of the tasks and the communication between the electronic devices 107, the electronic devices 107 may be able to receive and transmit data packets. The electronic devices 107 may receive the data packets from the network 116 through the network routing devices 108. Each network routing device 108 may have an initial network capacity value. The initial network capacity value associated with each network routing device 108 may be stored in the database 114.

Network routing devices 108 may be networking electrical devices. A networking electrical device may be a physical device, which may enable communication and interaction between the electronic devices 107 on the network 116. The networking electrical device may facilitate transmission of the packets of the data within the network 116. Non-limiting examples of the network routing device 108 may include a router, a switch, a hub, a network bridge, a gateway, a modem, and a repeater.

The network routing devices 108 are located between the electronic devices 107 located at different locations and the network 116. The network routing devices 108 may forward data packets between the electronic devices 107 via the network 116. The network routing devices 108 may perform functions of directing traffic of the data packets between the electronic devices 107 via the network 116. The data packets transmitted from one of the electronic devices 107 may be forwarded from a first network routing device 108a to a second network routing device 108b through the network 116 until the data packets reaches the destination.

The network routing devices 108 may execute a packet switching mechanism to forward the data packets between the electronic devices 107 via the network 116. The data packets may include network protocol packets. Each network protocol packet may contain a preamble. The preamble of the network protocol packet may contain sender electronic devices 107 addresses and recipient electronic devices 107 addresses. The network protocol packets may form a data stream over the network routing devices 108, which may be transmitted in the network 116 from the sender electronic devices 107 to the recipient electronic devices 107.

When the sender electronic devices 107 transmits the network protocol packets to the recipient electronic devices 107 via the network 116 through the network routing devices 108, if the first network routing device 108a fails, then the second network routing device 108b may take over the first network routing device 108a. Although three network routing devices 108 are illustrated, any number of the network routing devices 108 may transmit the network protocol packets from the sender electronic devices 107 to the recipient electronic devices 107.

Each network routing device 108 may be associated with a network capacity value. The network capacity value associated with each network routing device 108 may be stored in the database 114. In one embodiment, the network capacity value may correspond to a maximum volume of data packets transmitted to the electronic devices 107 from the network 116 over the predefined period. In another embodiment, the network capacity value may correspond to the maximum volume of the data packets transmitted from the sender electronic devices 107 to the recipient electronic devices 107 via the network 116 over the predefined period.

A server 112 is a computing device comprising a processing unit. The processing unit may include a processor with computer-readable medium, such as a random access memory coupled to the processor. The server 112 may be running algorithms or computer executable program instructions, which may be executed by a single processor or multiple processors in a distributed configuration. The server 112 may interact with one or more software modules of a same or a different type operating within the network capacity planning system 100.

Non-limiting examples of the processor may include a microprocessor, an application specific integrated circuit, and a field programmable object array, among others. Non-limiting examples of the server 112 may include a server computer, a workstation computer, a tablet device, and a mobile device (e.g., smartphone). For ease of explanation, FIG. 1 shows a single computing device functioning as the server 112. However, some embodiments may include multiple computing devices capable of performing the network monitoring tasks described herein.

The server 112 may be associated with the electronic devices 107, the network routing devices 108, the computing device 110, and the database 114 via the network 116. In operation, the server 112 may monitor a volume, a frequency, and a time duration of a transmission of data packets between the electronic devices 107 and the network 116 through the network routing devices 108 upon receiving a request from a computing device 110. In some embodiments, the server 112 may periodically monitor the volume, the frequency, and the time duration of transmission of the data packets between the electronic devices 107 and the network 116 through the network routing devices 108 after every predetermined interval of time. In one non-limiting example, the predetermined interval of time maybe one day. In another non-limiting example, the predetermined interval of time maybe one week. In yet another non-limiting example, the predetermined interval of time maybe one month.

The server 112 may store values associated with the volume, the frequency, and the time duration of the transmission of the data packets between the electronic devices 107 and the network 116 through the network routing devices 108 in the database 114. The server 112 may transmit the values associated with the volume, the frequency, and the time duration to the computing device 110, and the values may then be presented on an interactive graphical user interface of the computing device 110.

The server 112 may record timestamps of the transmitted data packets between the electronic devices 107 and the network 116 through the network routing devices 108. The timestamps may include information associated with the time at which the data packets received by the electronic devices 107. The timestamps may further include the information associated with the time at which the data packets transmitted from the network 116. The server 112 may store the timestamps associated with the data packets in the database 114. The server 112 may transmit the timestamps associated with the data packets to the computing device 110, and the timestamps may then be displayed on its interactive graphical user interface.

The server 112 may determine network traffic values associated with the network routing devices 108. In one embodiment, the server 112 may use values associated with the volume, the frequency, and the time duration of the transmission of the data packets between the electronic devices 107 and the network 116 through the network routing devices 108 to determine the network traffic values associated with the network routing devices 108. In another embodiment, the server 112 may use the timestamps of the transmitted data packets along with the values associated the volume, the frequency, and the time duration of the transmission of the data packets between the electronic devices 107 and the network 116 through the network routing devices 108 to determine the network traffic values associated with the network routing devices 108. The server 112 may store the network traffic values associated with the network routing devices 108 in the database 114.

The server 112 may compare the network traffic values associated with the network routing devices 108 with predetermined threshold values. When the network traffic values associated with the network routing devices 108 satisfy the predetermined threshold values, the server 112 may generate and execute an instruction. For instance, in one embodiment, the server 112 may compare the frequency and the time duration associated with the network routing devices 108 with the predetermined threshold values. When the frequency and the time duration associated with the network routing devices 108 satisfy the predetermined threshold values, the server may generate and execute the instruction. In another embodiment, the server 112 may compare the volume, the frequency, and the time duration associated with the network routing devices 108 with the predetermined threshold values. When the volume, the frequency, and the time duration associated with the network routing devices 108 satisfy the predetermined threshold values, the server 112 may generate and execute the instruction.

The server 112 may execute the instruction to retrieve a network capacity value associated with each network routing device 108 from the database 114. The database 114 may store the network capacity value associated with each network routing device 108. The network capacity value associated with each network routing device 108 may correspond to a bandwidth value of each network routing device 108. For example, the bandwidth value for the first network routing device 108a may refer to a consumed bandwidth value corresponding to a throughput value, which is an average rate of successful data transfer between the electronic devices 107 and the network 116 via the first network routing device 108a.

The server 112 may change and adjust the network capacity values associated with the network routing devices 108. In one embodiment, the server 112 may adjust the network capacity values associated with the network routing devices 108 based on results of the comparison of the volume, the frequency, and the time duration associated with the network routing devices 108 with the predetermined threshold values. In another embodiment, the server 112 may adjust the network capacity values associated with the network routing devices 108 based on real-time consumption demands of the electronic devices 107 determined from the results of the comparison. In yet another embodiment, the server 112 may adjust the network capacity values associated with the network routing devices 108 based on the real-time consumption demands of the electronic devices 107 and the overall capacity of the network 116. In yet another embodiment, the server 112 may adjust the network capacity values associated with the network routing devices 108 based on a technical configuration of the electronic devices 107, the real-time consumption demands of the electronic devices 107, and/or the overall capacity of the network 116.

The server 112 may store adjusted network capacity values associated with the network routing devices 108 in the database 114. The server 112 may transmit the adjusted network capacity values associated with the network routing devices 108 to the computing device 110, and the adjusted network capacity values may then be displayed on the interactive graphical user interface of the computing device 110.

The server 112 may continue to determine new network traffic values associated with the network routing devices 108 over a new predetermined period of time. The server 112 may store the new network traffic values associated with the network routing devices 108 in the database 114. The server 112 may compare the new network traffic values associated with the network routing devices 108 with the predetermined threshold values. When the new network traffic values associated with the network routing devices 108 satisfy the predetermined threshold values, the server 112 may generate and execute a new instruction. The server 112 may execute the new instruction to retrieve the adjusted network capacity values associated with the network routing devices 108 from the database 114. The server 112 may again update the adjusted network capacity values associated with the network routing devices 108. The server 112 may store updated network capacity values associated with the network routing devices 108 in the database 114. The server 112 may transmit the updated network capacity values associated with the network routing devices 108 to the computing device 110, and the updated network capacity values may then be displayed on the interactive graphical user interface of the computing device 110.

The computing device 110 is a computing device comprising a processing unit. The processing unit may execute a software application or a web browser application. The software application network may be a network data management software application. The processing unit may include a processor with a computer-readable medium, such as a random access memory coupled to the processor. The computing device 110 may be running algorithms or computer executable program instructions, which may be executed by a single processor or multiple processors in a distributed configuration. The computing device 110 may interact with one or more software modules of a same or a different type operating within the network capacity planning system 100.

Non-limiting examples of the processing unit may include a microprocessor, an application specific integrated circuit, and a field programmable object array, among others. Non-limiting examples of the computing device 110 may include a server computer, a workstation computer, a tablet device, and a mobile device (e.g., smartphone). A user may operate the computing device 110. For ease of explanation, FIG. 1 show a single computing device functioning as the computing device 110. However, some embodiments may include multiple computing devices capable of performing tasks described herein.

The computing device 110 may transmit credentials from the user inputs to a webserver (not shown). The webserver may use the user inputs to authenticate the user. The computing device 110 may include a number of input devices (e.g., mouse, keyboard, touchscreen, stylus) to receive the user inputs including various types of data inputs. The user inputs and the data inputs may include username, passwords, certificates, and biometrics. The user inputs and the data inputs may allow for the authentication of the user.

The computing device 110 may include an interactive graphical user interface on which the user may interact by means of an input device, such as a touch screen, a mouse, a keyboard, a keypad, among others. The interactive graphical user interface may collect data records from the database 114 and feed the data records to the user. The data records may include the data packets transmitted between the electronic devices 107 via the network 116 and the network routing devices 108, the network traffic values associated with the network routing devices 108, and the network capacity values associated with the network routing devices 108.

The computing device 110 may provide the interactive graphical user interface to the user to interact with the network data management software application. In some cases, the computing device 110 may provide the interactive graphical user interface to the user to interact with a user-centric network data management website hosted on the webserver. The computing device 110 may execute an Internet browser or a local software application, which may access the webserver, in order to issue network activity information requests or instructions to the server 112 to access or query the data records from the database 114.

The computing device 110 may execute the network data management software application running on an operating system of the computing device 110 for receiving and manipulating the data records stored in the database 114. The network data management software application may display interactive icons or buttons on the graphical user interface. The triggering of the icons may generate a screen having a plurality of portions on the interactive graphical user interface. A first portion of the screen may present a questionnaire associated with various questions related to various network routing devices 108. The user may select a particular network routing device 108 or a particular branch location for which the user may need a report for network activity. The user may submit answers to the questions related to the selected network routing device 108.

A second portion of the screen may provide a brief text box (for example, a text box with a pre-defined number of characters) having an expandable text capture capability to capture the user's explanation of the network activity information request. The text box may include pre-filled selections identifying common requests for the user to drag and select. The text box may include pre-filled request selections with the processor moving the most likely requests to a top of a list of options based on the analysis of the previous requests by the user. The processor may continually learn and assess using information associated with the previous requests of the user. The computing device 110 may upload machine-readable computer files containing user information or the network activity information request. The machine-readable computer files may be stored into document records in a local memory associated with the computing device 110.

The user may submit the network activity information request and additional information associated with the network activity information request on the interactive graphical user interface. The computing device 110 may then issue queries or instructions to the server 112 via the webpages generated by the web server, which may instruct the server 112 to perform various tasks based on the network activity information request. The tasks may include retrieving or updating the data records from the database 114. The tasks may further include adjusting the network capacity value associated with each network routing device 108 to manage any expected changes of resource utilization associated with the electronic devices 107 within the network 116. The server 112 may execute the tasks. The server 112 may generate and transmit an adjusted network capacity value associated with each network routing device 108 to the computing device 110. The computing device 110 may present each adjusted network capacity value on a specially designed interactive graphical user interface. The user may interact with information, such as the adjusted network capacity values presented on the interactive graphical user interface.

A database 114 may be capable of storing data records in a plain format and an encrypted version. The data records may include information associated with the company, the branches of the company, the location of each branch, a number of electronic devices 107 and nodes located at each branch, a type of electronic devices 107 located at each branch, a description and a specification of electronic devices 107 located at each branch, the user profile records, the network capacity value associated with each network routing device 108, and the network traffic value associated with each network routing device 108.

The database 114 may be in communication with a processor of the server 112, the electronic devices 107, the network routing device 108, and the computing device 110. The processor is capable of executing multiple commands of the network capacity planning system 100. The database 114 may be a part of the server 112. The database 114 may be a separate component in communication with the server 112. The database 114 may have a logical construct of data files and records, which may be stored in a non-transitory machine-readable storage media, such as a hard disk or memory, controlled by software modules of a database program (e.g., SQL), and a database management system that executes the code modules (e.g., SQL scripts) for various data queries and management functions.

Figure 2:
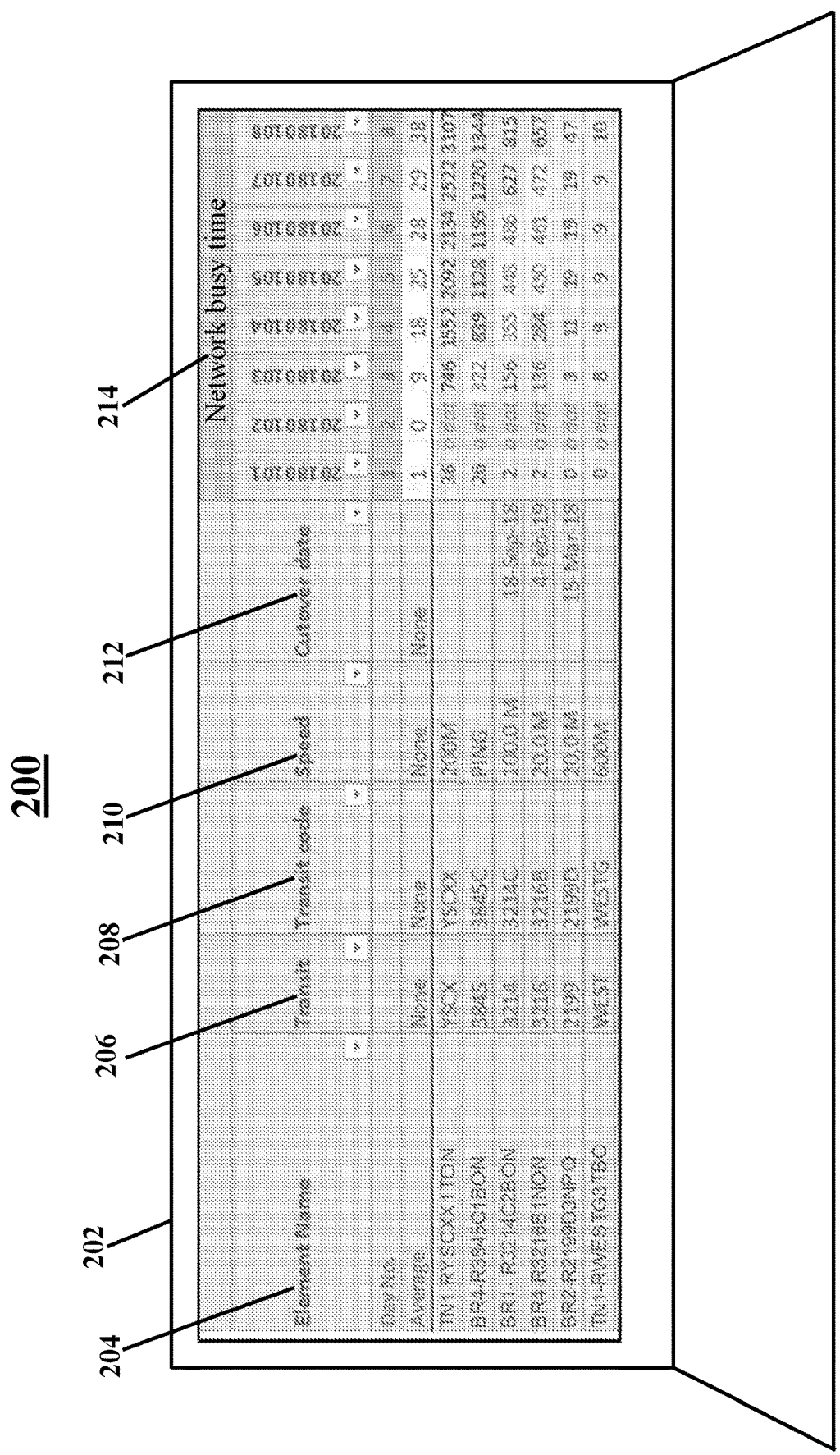
FIG. 2 shows network traffic values displayed on a graphical user interface of a computer of a network capacity planning system, according to an embodiment.

FIG. 2 shows network traffic values displayed on a graphical user interface 202 of a computer 200 of a network capacity planning system. The computer 200 may be a desktop computer of a user. The computer 200 may include a processor, which may perform one or more operations according to one or more programming instructions. The computer 200 is capable of communicating with a server using wired or wireless communication capabilities.

The computer 200 may install a network data management software application or use as a user-centric website. A network management company may generate the network data management software application as a widget to communicate with different types of users, and the widget may be displayed on a website of the network management company visible to all the users. The user may be a system administrator of the network management company. The user may use the network data management software application to view network data records associated with electronic devices and network routing devices within a network. In some configurations, a server, such as server 112 in the FIG. 1, can automatically monitor and adjust bandwidth for different network routing devices on receiving an instruction from the user.

The computer 200 may have access to pre-stored web-based interfaces, such as webpages, including a number of preconfigured sub-interfaces, or containers, that are dynamically populated (e.g., widget box). For example, the network data management software application webpages may contain code presenting a website of a number of webpages having a unique look-and-feel. One or more outputs may display the webpages, which may contain additional code for the containers, where the container code may display the network data management software application widget.

The user may access the webpage of the network data management software application to interact with the network data records displayed on the graphical user interface 202. The computer 200 may require user authentication based upon a set of user authorization credentials (e.g., username, password, biometrics, cryptographic certificate) to provide access to the network data management software application on the computer 200. For example, the computer 200 may access a local memory configured to store the user credentials, which a webserver may reference in order to determine whether a set of entered credentials purportedly authenticating the user match an appropriate set of credentials that identify and authenticate the user. Similarly, in some implementations, the webserver may generate and serve the webpages associated with the network data management software application to the computer 200 based upon a user profile account. The webserver may generate and serve the webpages associated with the network data management software application to the computer 200 based upon a membership of the user. The user profile may include data fields in user records stored in the local memory, and the webserver may conduct the authentication of the user and the user profile.

The user may access the network data management software application by a common access method, e.g., keying in a URL, selecting from search results, etc., and submit user credentials to access the network data management software application. Upon the server authenticating the user using credentials that identify the user as a valid member of the network management company, the network data management software application is presented on the graphical user interface 202.

A page associated with the network data management software application may display multiple selectable graphical components representing multiple table columns. A top portion of the graphical user interface 202 may display multiple selectable graphical components. A first selectable graphical component may be associated with a table column for an element name 204. The element name 204 may include names of the network routing devices at each branch, which are associated with the network and/or the electronic devices. A second selectable graphical component may be associated with a table column for a transit 206. A third selectable graphical component may be associated with a table column for a transit node 208. A fourth selectable graphical component may be associated with a table column for a speed 210. The speed 210 may include information associated with the speed of the transfer of the data packets associated with the network routing device. A fifth selectable graphical component may be associated with a table column for a cutover date 212. A sixth selectable graphical component may be associated with a table column for a network busy time 214 for a corresponding network routing device. The network busy time is a total amount of time (for example, in minutes) the network routing device is busy over a predetermined period (for example, each day). In one instance, the network routing device may be busy when the network routing device has a utilization of over 85 percent of a network capacity value (for instance, a bandwidth value) of the network routing device. The network busy time for each corresponding network routing device may be color-coded based on a value of the network busy time. For instance, the network busy time may be in green color when the network busy time is below a predetermined threshold value, then. When the network busy time is above the predetermined threshold value, then the network busy time may be mentioned in yellow color. When the network busy time is 10 points above the predetermined threshold value, then the network busy time may be mentioned in red color.

The user may view the color associated with the network busy time and determine action items to address the bandwidth capacity associated with corresponding network routing devices. The user may execute one or more instructions using an input device, such as a pointer of the computer 200 steps to increase or decrease the bandwidth capacity associated with one or more network routing devices.

The user may further interact with the multiple selectable graphical components using the input device. When the user interacts with a particular selectable graphical component among the multiple selectable graphical components, a bottom portion of the graphical user interface 202 may display multiple sub-interfaces. The multiple sub-interfaces may include comprehensive information associated with a data field presented in the particular selectable graphical component.

Figure 3:
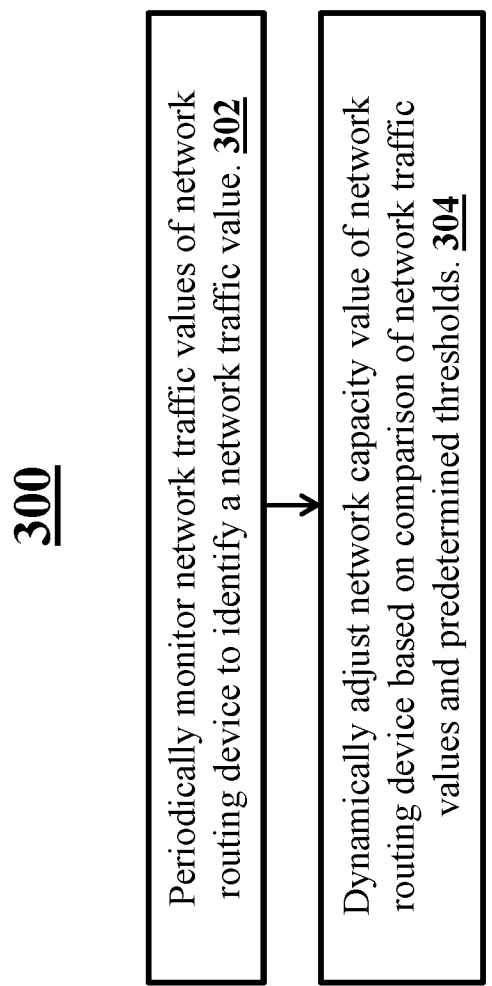
FIG. 3 shows a method for monitoring and adjusting a network capacity value associated with a network routing device of a network capacity planning system, according to an embodiment.

FIG. 3 shows execution steps of monitoring and adjusting network capacity values associated with network routing devices, according to a method 300. The method 300 shown in the FIG. 3 may include execution steps 302 and 304. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 of the FIG. 3 is described as being executed by a server computer in this embodiment. The server computer executing one or more steps may be programmed to execute various other, unrelated essential features. The steps may also be executed by a plurality of server computing devices operating in a distributed computing and network environment.

In a first step 302, a server may monitor network traffic values associated with one or more network routing devices. The server may periodically monitor the network traffic values associated with the one or more network routing devices after every predetermined interval of time. In one embodiment, the predetermined interval of time maybe one day. In another embodiment, the predetermined interval of time maybe one week. In yet another embodiment, the predetermined interval of time maybe one month. The server may store the network traffic values associated with the one or more network routing devices in a database. The server may transmit the network traffic values associated with the one or more network routing devices to a computing device. An interactive graphical user interface of the computing device may then display network traffic values associated with the one or more network routing devices.

The network traffic values may be associated with a volume of data packets transmitted from a network to a set of electronic devices through the one or more network routing devices after a predetermined interval of time. In one non-limiting example, the predetermined interval of time may be one day. In such a case, the server may determine that 10 kb data packets are transmitted on a first day, 12 kb data packets transmitted on a second day, 9 kb data packets transmitted on a third day, and so on. In another non-limiting example, the predetermined interval of time may be one week. In such a case, the server may determine that 50 kb data packets are transmitted in a first week, 44 kb data packets transmitted in a second week, 53 kb data packets transmitted in a third week, and so on.

The network traffic values may be associated with the volume and a frequency of the data packets transmitted from the network to the set of electronic devices through the one or more network routing devices. In one non-limiting example, the predetermined interval of time may be one week. In such a case, the server may determine that 50 kb data packets are transmitted in a first week where all these data packets were transmitted in 6 days, 44 kb data packets transmitted in a second week where all these data packets were transmitted in 4 days, 53 kb data packets transmitted in a third week where all these data packets were transmitted in 6 days, and so on. In another non-limiting example, the predetermined interval of time may be one month. In such a case, the server may determine that 100 kb data packets are transmitted in a first month where all these data packets were transmitted in 24 days, 114 kb data packets transmitted in a second week where all these data packets were transmitted in 27 days, 96 kb data packets transmitted in a third week where all these data packets were transmitted in 19 days, and so on.

The network traffic values may be associated with the volume, the frequency, and a time duration of the data packets transmitted from the network to the set of electronic devices through the one or more network routing devices. In one non-limiting example, the predetermined interval of time may be one week. In such a case, the server may determine that 50 kb data packets are transmitted in a first week where all the 50 kb data packets were transmitted in 6 days between 7 am-9 pm, 44 kb data packets transmitted in a second week where all the 44 data packets were transmitted in 4 days between 6 am-9 pm, 53 kb data packets transmitted in a third week where the 53 kb data packets may be transmitted in 6 days between 1 am-10 pm, and so on. In another non-limiting example, the predetermined interval of time may be one month. In such a case, the server may determine that 100 kb data packets are transmitted in a first month where all these data packets were transmitted in 24 days between 7 am-9 pm, 114 kb data packets transmitted in a second week where all these data packets were transmitted in 27 days between 7 am-9 pm, 96 kb data packets transmitted in a third week where all these data packets were transmitted in 19 days between 7 am-9 pm, and so on.

The server may compare the network traffic values associated with the one or more network routing devices with predetermined threshold values. The predetermined threshold values include predetermined network usage threshold values, such as a maximum bandwidth capacity of a network. When the network traffic values associated with the one or more network routing devices satisfy the predetermined threshold values, the server may generate an alert. The alert may include information associated with the results of the comparison. The alert may further include one or more instructions to address potential problems, which may arise from the results of the comparison. The one or more instructions may include steps to increase or decrease one or more network capacity values of the one or more network routing devices. The server may transmit the alert to the computing device. The interactive graphical user interface of the computing device may display the alert.

In some embodiments, the server may process the network traffic values monitored over a predetermined period of time (for example, one week) to calculate a network busy time at each of the one or more network routing devices over the same predetermined period of time. The network busy time for each network routing device may be a time spent above a first predetermined value (for instance, 85 percent) of utilization of the network capacity of the network routing device. When the network busy time is above a second predetermined value (for instance, 5 percent) of a total number of hours of operations at each branch over the predetermined period, then the server may generate an alert. The alert may include one or more instructions. The one or more instructions may include steps to increase or decrease the network capacity value of the one or more network routing devices. The server may transmit the alert to the computing device. The interactive graphical user interface of the computing device may display the alert.

In a next step 304, a server may retrieve a network capacity value associated with the one or more network routing devices from a database in response to the generation of the alert or receiving an instruction from the computing device. The database may store the network capacity value associated with each of a plurality of network routing devices. The network capacity value associated with each network routing device may correspond to a bandwidth of each network routing device. In one instance, the network capacity value associated with the network routing device may be a maximum volume of data packets transmitted to the set of electronic devices from the network via the network routing device.

The server may dynamically adjust the network capacity value of the one or more network routing devices. The adjusted network capacity value of the one or more network routing devices may become a new network capacity value associated with the one or more network routing devices. The server may determine the new network capacity value associated with the one or more network routing devices based on real-time consumption demands of the electronic devices in different branches, which are determined from the results of the comparison between the network traffic values associated with the network routing device and the predetermined threshold values. In some embodiments, the server may determine the new network capacity value associated with the one or more network routing devices based on an examination of a technical specification of the electronic devices in the different branches and the network routing devices, in view of the real-time consumption demands of the electronic devices.

The server may store the new network capacity value of the one or more network routing devices in the database. The server may transmit the new network capacity value associated with the one or more network routing devices to the computing device. The interactive graphical user interface of the computing device may display the new network capacity value.

Non-Limiting Example

A bank may use the methods and systems described herein to regulate network capacity provided to different branches. The network in this non-limiting example may correspond to a secure/private network used for various secure communications and transactions by each branch. Therefore, regulating the network capacity provided to each branch may increase efficiency. A central server of the bank (e.g., the server 112 described in FIG. 1) may dynamically allocate the network capacity to different branches based on their respective network usage. In that way, the central server ensures that various branches have network capacity that corresponds to their needs, which ensures that network capacity increases/decreases are justified.

The central server may monitor network activity for each branch. To do so, the central server may first monitor and network routing device associated with each branch. The network routing device may be any hardware and/or software device/program configured to transmit data packets among various electronic devices of each branch to/from the network in accordance with a predetermined bandwidth threshold. For instance, a predetermined bandwidth threshold of 10 MB per second identifies that the corresponding network routing device has a capacity to transmit data from various electronic devices of a branch to/from the network at a rate of 10 MB per second.

To effectively manage the bandwidth (e.g., network capacity) at each branch without any delay, each branch is allocated an appropriate amount of bandwidth resources in accordance with their current and anticipated utilization of network bandwidth. The central server may periodically and continuously monitor network activity of different network routing devices associated with each branch. For instance, the central server may monitor a volume of data packets transmitted using each network routing device. The frequency of which the central server monitors the network traffic may be predetermined and may be revised by the system administrator.

The central server may identify a network traffic value for each network routing device associated with each branch. To achieve this, the central server may first generate a network busy time associated with each network routing device. The busy time may correspond to a time window in which the network routing device is at a predetermined capacity, such as 85% or more capacity of data transmittal (e.g., 85 of the maximum bandwidth threshold). The predetermined capacity may be revised by the system administrator or may be set at a default rate. The network traffic value may identify a frequency of which each network routing device is within the network busy time. For instance, the network traffic value may identify that a network routing device of branch A is 5%. This value indicates that a network routing device of branch A is above the 85% threshold, 5% of the time (e.g., 5% of the total business hours over the course of the week or any other time window monitored by the central server). In some embodiments, the central server may continuously/periodically monitor network activity for each branch and may dynamically (e.g., in real-time) revise the network traffic value.

Upon identifying network traffic values for each branch, the central server may generate a graphical user interface where different branches and their corresponding network traffic values are displayed. The graphical user interface may display network traffic values that satisfy the predetermined threshold or other criteria in a visually distinct manner, such as by displaying them in different colors. A system administrator viewing the graphical user interface may instruct the central server to dynamically revise the network capacity associated with each network routing device. For instance, the central server calculates the network traffic value for branch A as 5%. Therefore, the central server identifies that branch A has a relatively low network traffic. As a result, the central server may display a graphical indicator corresponding to branch A using a color that indicates a relative low network traffic value (e.g., green). In contrast, the central server may identify that branch B has a network traffic value of 80% (i.e., branch B has a network routing device that is within 85% of its capacity 80% of the time). The central server may display branch B using a color that indicates a relatively high network traffic value (e.g., red).

A system administrator viewing the graphical user interface can easily identify that network capacity should be reallocated among branches A and B. More specifically, the system administrator may instruct central server to allocate more network capacity (e.g., higher bandwidth) to branch B. In some embodiments, the overall network capacity may be reallocated from branch A to branch B (e.g., network capacity of branch A may be decreased while network capacity of branch B may be increased).

In some configurations, the central server may transmit an automatic alert to a system administrator notifying the system administrator that a branch has a network capacity that satisfies a predetermined threshold. For instance, if the network capacity value of branch C increases to a 90% value, the central server may automatically generate and send an alert to a system administrator. The alert may indicate that branch C is in critical network condition and the system administrator should consider increasing its network capacity. In some other configurations, the central server may automatically allocate and/or reallocate network capacity among different branches. In such configurations, the central server may initially allocate equal network capacity to all branches (i.e., ⅓ network capacity to each branch A-C). The central server may continuously monitor network traffic value of each branch and may dynamically reallocate the network capacity among different branches, such that the central server allocates 50% of network capacity to branch C, 35% of network capacity to branch B, and 15% of network capacity to branch A.

The revise the network capacity of each branch, the central server may transmit an instruction to the corresponding network routing device and modify its configurations, such that the network capacity is increased.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    identifying, by a server, a plurality of network traffic values of a plurality of network routing devices, wherein each network traffic value corresponds to a measured volume of data packets communicated between a network and a set of electronic devices through at least one network routing device, each network traffic value indicating a percentage of an amount of time the at least one network routing device is communicating data packets to the set of electronic devices at a network capacity threshold;
    generating a network busy time associated with each network routing device, wherein each network traffic value identifies a frequency of which each network routing device is within the network busy time; and
    displaying, by the server, a dashboard comprising an indication of the plurality of network routing devices and a corresponding network traffic value.

2. The method of claim 1, wherein the dashboard further comprises a network speed for at least one network routing device.

3. The method of claim 1, wherein the dashboard further comprises a network busy time value for at least one network routing device.

4. The method of claim 1, wherein at least one indication within the dashboard has a color indicating its respective value.

5. The method of claim 1, wherein the dashboard comprises an input element configured to receive an instruction to increase or decrease a bandwidth value associated with at least one network routing device.

6. The method of claim 1, further comprising: dynamically adjusting, by the server, a network capacity value of the network routing device when the network traffic value satisfies a threshold.

7. The method of claim 1, further comprising:
    generating, by the server, an alert when the network traffic value satisfies a threshold.

8. A system comprising:
    a server in communication with network routing device, the server comprising a processor and a non-transitory computer-readable medium containing instructions that when executed by the processor causes the processor to perform operations comprising:
        identify a plurality of network traffic values of a plurality of network routing devices, wherein each network traffic value corresponds to a measured volume of data packets communicated between a network and a set of electronic devices through at least one network routing device, each network traffic value indicating a percentage of an amount of time the at least one network routing device is communicating data packets to the set of electronic devices at a network capacity threshold;
        generating a network busy time associated with each network routing device, wherein each network traffic value identifies a frequency of which each network routing device is within the network busy time; and
        display a dashboard comprising an indication of the plurality of network routing devices and a corresponding network traffic value.

9. The system of claim 8, wherein the dashboard further comprises a network speed for at least one network routing device.

10. The system of claim 8, wherein the dashboard further comprises a network busy time value for at least one network routing device.

11. The system of claim 8, wherein at least one indication within the dashboard has a color indicating its respective value.

12. The system of claim 8, wherein the dashboard comprises an input element configured to receive an instruction to increase or decrease a bandwidth value associated with at least one network routing device.

13. The system of claim 8, wherein the instruction further cause the processor to dynamically adjust a network capacity value of the network routing device when the network traffic value satisfies a threshold.

14. The system of claim 8, wherein the instruction further cause the processor to generate an alert when the network traffic value satisfies a threshold.

15. A system comprising a processor configured to:
    identify a plurality of network traffic values of a plurality of network routing devices, wherein each network traffic value corresponds to a measured volume of data packets communicated between a network and a set of electronic devices through at least one network routing device, each network traffic value indicating a percentage of an amount of time the at least one network routing device is communicating data packets to the set of electronic devices at a network capacity threshold;
    generating a network busy time associated with each network routing device, wherein each network traffic value identifies a frequency of which each network routing device is within the network busy time; and
    display a dashboard comprising an indication of the plurality of network routing devices and a corresponding network traffic value.

16. The system of claim 15, wherein the dashboard further comprises a network speed for at least one network routing device.

17. The system of claim 15, wherein the dashboard further comprises a network busy time value for at least one network routing device.

18. The system of claim 15, wherein at least one indication within the dashboard has a color indicating its respective value.

19. The system of claim 15, wherein the dashboard comprises an input element configured to receive an instruction to increase or decrease a bandwidth value associated with at least one network routing device.

20. The system of claim 15, wherein the processor is further configured to generate an alert when the network traffic value satisfies a threshold.

* * * * *